United States Patent
Takeda et al.

(10) Patent No.: US 10,444,837 B2
(45) Date of Patent: Oct. 15, 2019

(54) TACTILE SENSATION PROVIDING APPARATUS

(71) Applicant: KYOCERA Corporation, Kyoto (JP)

(72) Inventors: Jun Takeda, Yokohama (JP); Kenji Kono, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 59 days.

(21) Appl. No.: 15/106,942

(22) PCT Filed: Dec. 18, 2014

(86) PCT No.: PCT/JP2014/006335
§ 371 (c)(1),
(2) Date: Jun. 21, 2016

(87) PCT Pub. No.: WO2015/098062
PCT Pub. Date: Jul. 2, 2015

(65) Prior Publication Data
US 2017/0038841 A1    Feb. 9, 2017

(30) Foreign Application Priority Data

Dec. 24, 2013  (JP) ................. 2013-265905

(51) Int. Cl.
*G06F 3/01* (2006.01)
*G06F 3/041* (2006.01)

(52) U.S. Cl.
CPC .............. *G06F 3/016* (2013.01); *G06F 3/041* (2013.01); *G06F 3/0416* (2013.01); *G06F 2203/014* (2013.01)

(58) Field of Classification Search
None
See application file for complete search history.

(56) References Cited

U.S. PATENT DOCUMENTS

| 7,205,978 B2 | 4/2007 | Poupyrev et al. |
| 7,755,607 B2 | 7/2010 | Poupyrev et al. |
| (Continued) | | |

FOREIGN PATENT DOCUMENTS

| EP | 2472365 A1 | 7/2012 |
| JP | 2003-288158 A | 10/2003 |
| (Continued) | | |

OTHER PUBLICATIONS

An Office Action issued by the Japanese Patent Office dated Aug. 8, 2017, which corresponds to Japanese Patent Application No. 2013-265905 and is related to U.S. Appl. No. 15/106,942, with English language Concise Explanation.

(Continued)

*Primary Examiner* — Bryan Earles
(74) *Attorney, Agent, or Firm* — Studebaker & Brackett PC

(57) ABSTRACT

A tactile sensation providing apparatus 1 includes a contact detection unit 20 for detecting a contact, pressing detection units 42 and 44 for detecting pressing to the contact detection unit 20, a plurality of vibration units 52, 54, 56, and 58 for vibrating the contact detection unit 20, and a controller 10 for controlling such that, when data based on the pressing detected by the pressing detection units 42 and 44 satisfy a predetermined criterion, each of the plurality of vibration units 52, 54, 56, and 58 vibrates in respective modes and an intended tactile sensation is provided to a contact object pressing the contact detection unit 20 at a position where the contact object is in contact with the contact detection unit 20.

8 Claims, 5 Drawing Sheets

(56) References Cited

U.S. PATENT DOCUMENTS

| | | | |
|---|---|---|---|
| 8,593,409 B1* | 11/2013 | Heubel | G06F 3/041 |
| | | | 345/173 |
| 9,196,134 B2* | 11/2015 | Levesque | G06F 3/016 |
| 9,292,090 B2* | 3/2016 | Hirose | G06F 3/016 |
| 9,870,094 B2* | 1/2018 | Harris | G06F 3/0433 |
| 10,019,062 B2* | 7/2018 | Backman | G06F 3/041 |
| 2003/0174121 A1 | 9/2003 | Poupyrev et al. | |
| 2006/0279537 A1* | 12/2006 | Kim | G06F 3/016 |
| | | | 345/156 |
| 2007/0146316 A1 | 6/2007 | Poupyrev et al. | |
| 2009/0284485 A1* | 11/2009 | Colgate | G06F 3/016 |
| | | | 345/173 |
| 2010/0141606 A1 | 6/2010 | Bae et al. | |
| 2010/0156818 A1 | 6/2010 | Burrough et al. | |
| 2011/0090167 A1* | 4/2011 | Harris | G06F 3/016 |
| | | | 345/173 |
| 2011/0260996 A1* | 10/2011 | Henricson | G06F 3/016 |
| | | | 345/173 |
| 2012/0194460 A1* | 8/2012 | Kuwabara | G06F 3/016 |
| | | | 345/173 |
| 2012/0229407 A1* | 9/2012 | Harris | G06F 3/016 |
| | | | 345/173 |
| 2012/0249462 A1* | 10/2012 | Flanagan | G06F 1/1694 |
| | | | 345/173 |
| 2012/0293435 A1* | 11/2012 | Miki | G06F 3/016 |
| | | | 345/173 |
| 2013/0127755 A1 | 5/2013 | Lynn et al. | |
| 2013/0278400 A1* | 10/2013 | Harris | G06F 3/016 |
| | | | 340/407.1 |
| 2013/0314220 A1* | 11/2013 | Colgate | G06F 3/016 |
| | | | 340/407.1 |
| 2014/0071071 A1* | 3/2014 | Hirose | G06F 3/0488 |
| | | | 345/173 |
| 2014/0132568 A1 | 5/2014 | Hirose et al. | |
| 2015/0070149 A1* | 3/2015 | Cruz-Hernandez | G08B 6/00 |
| | | | 340/407.1 |
| 2016/0132117 A1* | 5/2016 | Adachi | G06F 3/0488 |
| | | | 345/173 |

FOREIGN PATENT DOCUMENTS

| | | |
|---|---|---|
| JP | 2005-258666 A | 9/2005 |
| JP | 2008-130055 A | 6/2008 |
| JP | 2012-027765 A | 2/2012 |
| JP | 2012-113644 A | 6/2012 |
| JP | 2013-250710 A | 12/2013 |
| WO | 2013/161163 | 10/2013 |

OTHER PUBLICATIONS

International Search Report issued in PCT/JP2014/006335; dated Jan. 27, 2015.

Written Opinion issued in PCT/JP2014/006335; dated Jan. 27, 2015; with English language Concise Explanation.

The extended European search report issued by the European Patent Office dated Jun. 19, 2017, which corresponds to European Patent Application No. 14873475.9-1972 and is related to U.S. Appl. No. 15/106,432.

An Office Action issued by the European Patent Office dated May 11, 2018, which corresponds to European Patent Application No. 14873475.9-1216 and is related to U.S. Appl. No. 15/106,942.

\* cited by examiner

TACTILE SENSATION PROVIDING APPARATUS

CROSS REFERENCE TO RELATED APPLICATION

This application claims priority to and the benefit of Japanese Patent Application No. 2013-265905 filed on Dec. 24, 2013, the entire contents of which are incorporated herein by reference.

TECHNICAL FIELD

The present invention relates to an apparatus for providing a tactile sensation and to an apparatus for providing the tactile sensation based on an operation to a contact detection unit such as a touch sensor.

BACKGROUND ART

Conventionally, a mobile terminal such as a mobile phone is equipped with an input apparatus having a touch sensor such as a touch panel and a touch switch serving as an element for detecting a user operation. Other than in the mobile terminal, the input apparatus having the touch sensor are widely employed in information appliances such as a calculator and a ticket vending machine as well as in home appliances such as a microwave, a TV, and lightning equipment, industrial equipment (FA equipment), and the like.

There are known a variety of types for the touch sensor to detect a contact such as a resistive film type, a capacitive type, an optical type, and the like. However, a touch sensor employing any one of these types detects an operation performed by a finger or a stylus pen but, when being contacted, does not physically deforms like a press-button switch.

Therefore, even when the operation to the touch sensor is correctly recognized by the input apparatus, the user having performed the operation cannot obtain feedback of the operation. Therefore, the user cannot obtain an operation sensation that may be obtained when the user presses a key or a button constituted by using a mechanical press-button switch. As such, there has been conventionally known a feedback method to provide vibration to the user's finger by vibrating the touch sensor when the touch sensor detects a contact (for example, see PLT 1 and PLT 2).

CITATION LIST

Patent Literatures

PLT 1: JP-A-2003-288158
PLT 2: JP-A-2008-130055

SUMMARY

According to techniques disclosed in the PLT 1 and the PLT 2, upon detection of the operation to the touch sensor, vibration may be provided to the user's fingertip and the like. Therefore, when operating such an apparatus, the user may know, through a tactile sensation, that the operation to the touch sensor is correctly recognized by the apparatus.

However, the conventional apparatus for providing the vibration as the feedback has difficulty in providing an intended tactile sensation constituted by predetermined conditions desired by a manufacturer of the apparatus. That is, the feedback of the vibration provided by such a conventional apparatus did not necessarily meet a desired purpose.

Further, there has been a problem that, when the conventional apparatus is configured to provide the intended tactile sensation constituted by the predetermined conditions, due to properties such as vibration transmissibility of a housing of the apparatus and the like, the conventional apparatus has difficulty in efficiency providing the intended tactile sensation.

Therefore, it could be helpful to provide a tactile sensation providing apparatus capable of efficiently providing the intended tactile sensation constituted by the predetermined conditions.

In order to solve the above problem, a tactile sensation providing apparatus according to a first aspect of the disclosure herein includes:

a contact detection unit configured to detect a contact;
a pressing detection unit configured to detect pressing to the contact detection unit;
a plurality of vibration units configured to vibrate the contact detection unit; and
a controller configured to vibrate each of the plurality of vibration units when data based on the pressing detected by the pressing detection unit satisfy a predetermined criterion such that an intended tactile sensation is provided to a contact object pressing the contact detection unit at a position where the contact object is in contact with the contact detection unit.

The controller, in vibrating each of the plurality of vibration units, may temporarily adjust a vibration wave generated by each of the plurality of vibration units such that the intended tactile sensation is provided.

The controller, in vibrating each of the plurality of vibration units, may adjust a frequency of a vibration wave generated by each of the plurality of vibration units such that the intended tactile sensation is provided.

The controller may control such that
when the contact detection unit detects the contact, each of the plurality of vibration units is vibrated and a first intended tactile sensation is provided to the contact object in contact with the contact detection unit, and
when the data based on the pressing detected by the pressing detection unit satisfy the predetermined criterion, each of the plurality of vibration units is vibrated and a second intended tactile sensation is provided to the contact object pressing the contact detection unit at the position where the contact object is in contact with the contact detection unit.

The controller controls such that, when the data based on the pressing detected by the pressing detection unit satisfy the predetermined criterion, each of the plurality of vibration units is vibrated and an intended tactile sensation corresponding to the data based on the pressing is provided to the contact object pressing the contact detection unit at the position where the contact object is in contact with the contact detection unit.

Our tactile sensation providing apparatus may efficiently provide an intended tactile sensation constituted by predetermined conditions.

DETAILED DESCRIPTION

Hereinafter, embodiments of the disclosure herein will be described with reference to the accompanying drawings.

First Embodiment

Hereinafter, a tactile sensation providing apparatus according to a first embodiment will be described with reference to the accompanying drawings. The tactile sensation providing apparatus of the disclosure herein may be a mobile phone, a smartphone, a tablet PC, a laptop PC, and the like having a touch panel. However, the disclosure herein is not limited to such a mobile apparatus but may be a variety of electronic apparatuses such as a desktop PC, a home appliance, industrial equipment (FA equipment), a special terminal, and the like having the touch panel.

Figure 1:
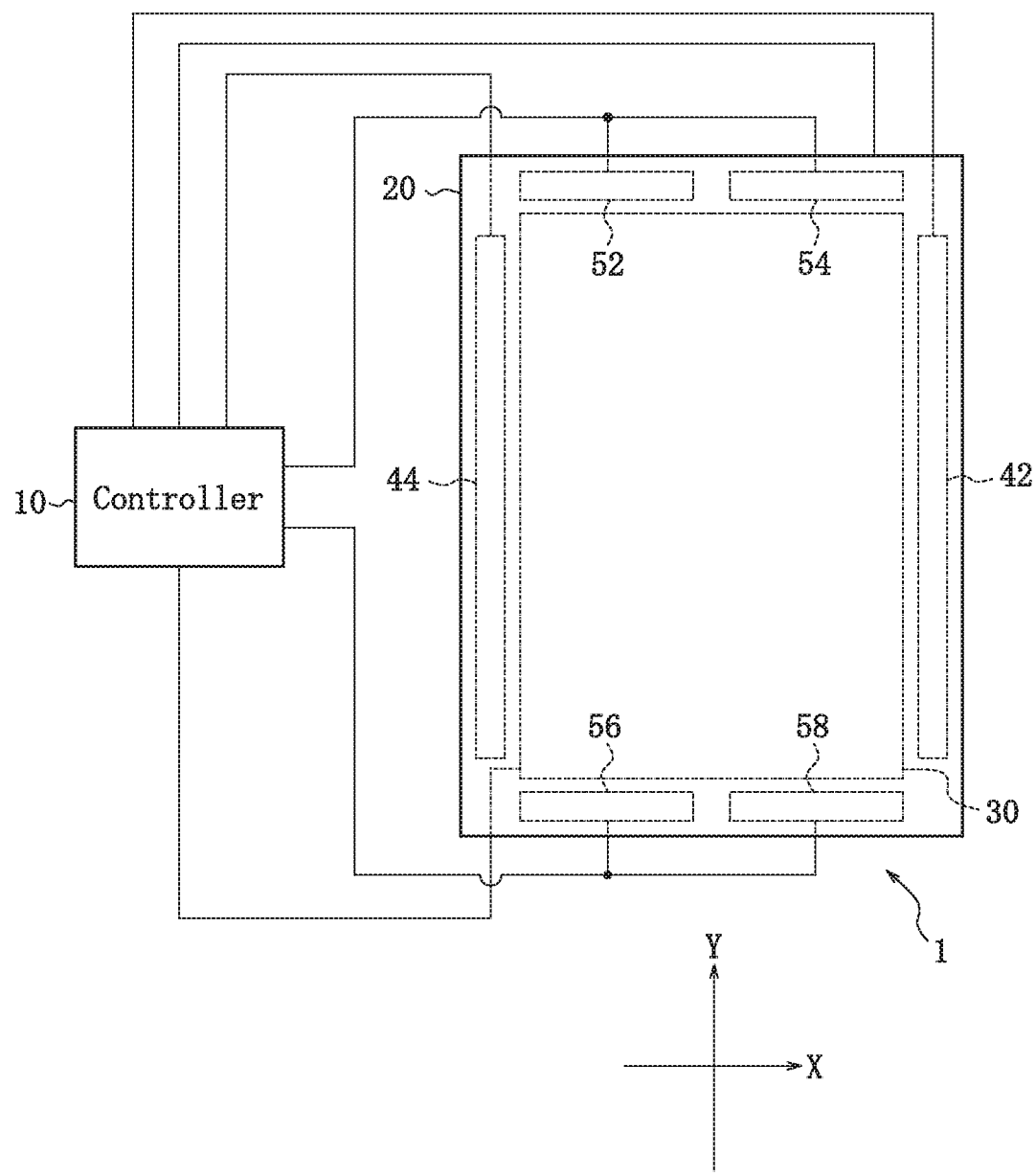
FIG. 1 is a functional block diagram illustrating a schematic configuration of a tactile sensation providing apparatus according to a first embodiment of the disclosure herein.

FIG. 1 is a block diagram illustrating a schematic configuration of the tactile sensation providing apparatus according to the first embodiment.

As illustrated in FIG. 1, a tactile sensation providing apparatus 1 according to the first embodiment includes a controller 10, a contact detection unit 20, a display unit 30, pressing detection units 42 and 44, and a plurality of vibration units 52, 54, 56, and 58.

The controller 10 controls and manages each function unit and all components of the tactile sensation providing apparatus 1. The controller 10 may be constituted by using a processor, a microcomputer, or the like that is capable of executing application software. Hereinafter, the controller 10 is assumed to appropriately include a storage unit configured by using a memory or the like capable of storing various information as necessary. According to the present embodiment, the controller 10, especially when the tactile sensation providing apparatus 1 operates to provide a tactile sensation, controls and manages each function unit and component as necessary. The control carried out by the controller 10 will be described in detail later.

The contact detection unit 20 detects a contact by the operator's finger, a stylus pen, or the like (hereinafter, referred to as a "contact object") to a contact detection surface (an operation plane). The contact detection unit 20 may employ any contact detection method including a capacitive type, a resistive film type, a surface acoustic wave type (or an ultrasound type), an infrared type, an electromagnetic induction type, and a load detection type. The contact detection unit 20, based on the detection of the contact by the contact object, outputs information on a location of the contact object in contact with the contact detection surface to the controller 10. Thereby, the controller 10 may acquire the location of the contact detected by the contact detection unit 20.

The contact detection unit 20 may be constituted by using, for example, a transparent member having, on a back side thereof, a display unit 30 that may be constituted by using a display device such as a liquid crystal display (LCD), an organic EL display, or an inorganic EL display. In FIG. 1, the display unit 30 is indicated by broken lines so as to mean that the display unit 30 is arranged on the back side (a rear side) of the contact detection unit 20. This configuration allows that an object depicting a key, a button, an icon, or the like are displayed in the display unit 30 and a contact (a touch) operation thereto by the operator is detected by the contact detection unit 20. The display unit 30 may be attached to the rear side of the contact detection unit 20 by a joint member such as a double-sided tape or the like. Or, the display unit 30 may be attached to the rear side of the contact detection unit 20 via an intermediate member such as a sheet metal, or may be attached to a support member.

The display unit 30 may display various images and videos based on image/video data supplied from the controller 10. In this case, the controller 10 supplies necessary image/video data to the display unit 30 at appropriate timings. However, since the tactile sensation providing apparatus 1 does not have to display the images or the video, a detailed description of the display of the images and the videos will be omitted here. Also, when the contact detection unit 20 is configured to not need to display any image or video on a front side thereof, the display unit 30 is not essential.

The pressing detection units 42 and 44 detect pressing when the contact object comes into contact with and presses the contact detection unit 20. That is, the pressing detection units 42 and 44 detect pressing to the contact detection unit 20. The pressing detection units 42 and 44 may be constituted by using, for example, an element such as a strain gauge sensor or a piezoelectric element that changes physical or electrical property (strain, resistance, voltage, etc.) in response to the pressing and linearly reacts with a load. The pressing detection units 42 and 44, based on the detection of the contact to the contact detection unit 20 by the contact object, outputs information on the pressing by the contact object in contact with the contact detection surface to the controller 10. Thereby, the controller 10 may acquire the information on the pressing detected by the pressing detection units 42 and 44.

For example, when the pressing detection units 42 and 44 are constituted by using respective piezoelectric elements, based on a magnitude of a load (force) (or based on a speed (acceleration) of a change in the load (force)) of the pressing to the contact detection surface of the contact detection unit 20, a voltage (a voltage value) output due to the electrical characteristics of the piezoelectric element changes. In this case, the pressing detection units 42 and 44 may inform the controller 10 of the voltage (the voltage value (hereinafter, simply referred to as "data")). The controller 10 acquires the data when the pressing detection units 42 and 44 send the data to the controller 10, or when the controller 10 itself detects the data of the piezoelectric elements from the pressing detection units 42 and 44. That is, the controller 10, by acquiring data based on the pressing from the pressing detection units 42 and 44, acquires the data based on the pressing by the operator to the contact detection surface of the contact detection unit 20.

In the configuration illustrated in FIG. 1, in the vicinity of edges of the contact detection unit 20, the pressing detection units 42 and 44 are arranged parallel to a Y-axis direction illustrated in the figure. In FIG. 1, the pressing detection units 42 and 44 are indicated by broken lines so as to mean that the pressing detection units 42 and 44 are arranged on the back side (the rear side) of the contact detection unit 20.

However, the arrangement of the pressing detection units 42 and 44 is not limited to the example illustrated in FIG. 1. The pressing detection units 42 and 44 may be arranged in a variety of manners based on a shape and an arrangement manner of the contact detection unit 20, a mode of the pressing to be detected by the contact detection unit 20, a mode of a tactile sensation to be provided by the tactile sensation providing apparatus 1, and the like. Also, the number of the pressing detection units 42 and 44 is not limited to two but may be any number. The pressing detection units 42 and 44 are attached to the contact detection unit 20 via the joint member (for example, the double-sided tape). The pressing detection units 42 and 44 may be attached to the contact detection unit 20 via the intermediate member (for example, the sheet metal).

A plurality of vibration units 52, 54, 56, and 58 vibrate the contact detection unit 20 and thereby causing vibration of the contact detection surface of the contact detection unit 20 in a predetermined vibration pattern. The vibration units 52, 54, 56, and 58 may be constituted by using, for example, piezoelectric oscillators or the like.

In the configuration illustrated in FIG. 1, in such a manner as to appropriately provide a desired tactile sensation, in the vicinity of the edges of the contact detection unit 20, the vibration units 52 and 54 are arranged in an upper area of the contact detection unit 20 and the vibration units 56 and 58 are arranged in a lower area, in a state that all of the vibration units are in parallel with an X-axis direction illustrated in the figure. In FIG. 1, the vibration units 52, 54, 56, and 58 are indicated by broken lines so as to mean that the vibration units 52, 54, 56, and 58 are arranged on the back side (the rear side) of the contact detection unit 20. The arrangement of the vibration units 52, 54, 56, and 58 is not limited to the example illustrated in FIG. 1. The vibration units 52, 54, 56, and 58 may be arranged in a variety of manners based on the tactile sensation to be provided by the tactile sensation providing apparatus 1, and the like. Also, the number of the vibration units 52, 54, 56, and 58 is not limited to four but may be any number. The vibration units 52, 54, 56, and 58 are attached to the contact detection unit 20 via the joint member (for example, the double-sided tape). The vibration units 52, 54, 56, and 58 may be attached to the contact detection unit 20 via the intermediate member (for example, the sheet metal).

The vibration units 52, 54, 56, and 58 cause the vibration of the contact detection surface of the contact detection unit 20, thereby providing the tactile sensation to the contact object in contact with the contact detection surface. In order for the vibration units 52, 54, 56, and 58 to vibrate and provide the tactile sensation to the contact object, the controller 10 supplies a drive signal that allows the provision of the predetermined tactile sensation, at appropriate timing. The drive signal output by the controller 10 for the provision of the tactile sensation will be described below. In FIG. 1, also, the controller 10 supplies the same drive signal to the vibration units 52 and 54 arranged in the upper area and the same drive signal to the vibration units 56 and 58 arranged in the lower area. However, the controller 10 may supply different drive signals to each of the vibration units 52, 54, 56, and 58.

When the pressing detection units 42 and 44 are constituted by using the piezoelectric elements, the controller 10 supplies the predetermined drive signal to the piezoelectric elements, thereby vibrating the piezoelectric elements and providing the tactile sensation to the operator's finger or the like. According to the present embodiment, therefore, the pressing detection units 42 and 44 may also function as vibration units similar to the vibration units 52, 54, 56, and 58. That is, the pressing detection units 42 and 44 constituted by using the piezoelectric elements may also function as the vibration units 52, 54, 56, and 58. In the following description, however, the vibration units 52, 54, 56, and 58 are provided independently from the pressing detection units 42 and 44.

FIG. 1 omits a housing in which the contact detection unit 20 having the pressing detection units 42 and 44 and the vibration units 52, 54, 56, and 58 is attached. The contact detection unit 20 is finally attached to the housing that constitutes a main body of the tactile sensation providing apparatus 1 which may be a variety of electronic apparatuses. The housing preferably includes the controller 10 illustrated in FIG. 1 as well as other necessary circuits and function units incorporated therein. In this case, preferably, the contact detection unit 20 is attached to the housing in such a manner to be able to vibrate in an appropriate manner. For example, when all edges of the contact detection unit 20 are firmly fixed to the housing or the like, amplitude of the vibration of the contact detection unit 20 is limited, making it difficult to provide an excellent tactile sensation to the operator. Therefore, for example, the touch panel is attached to the housing via an elastic member or partially fixed to the housing so as to be able to vibrate.

Figure 2:
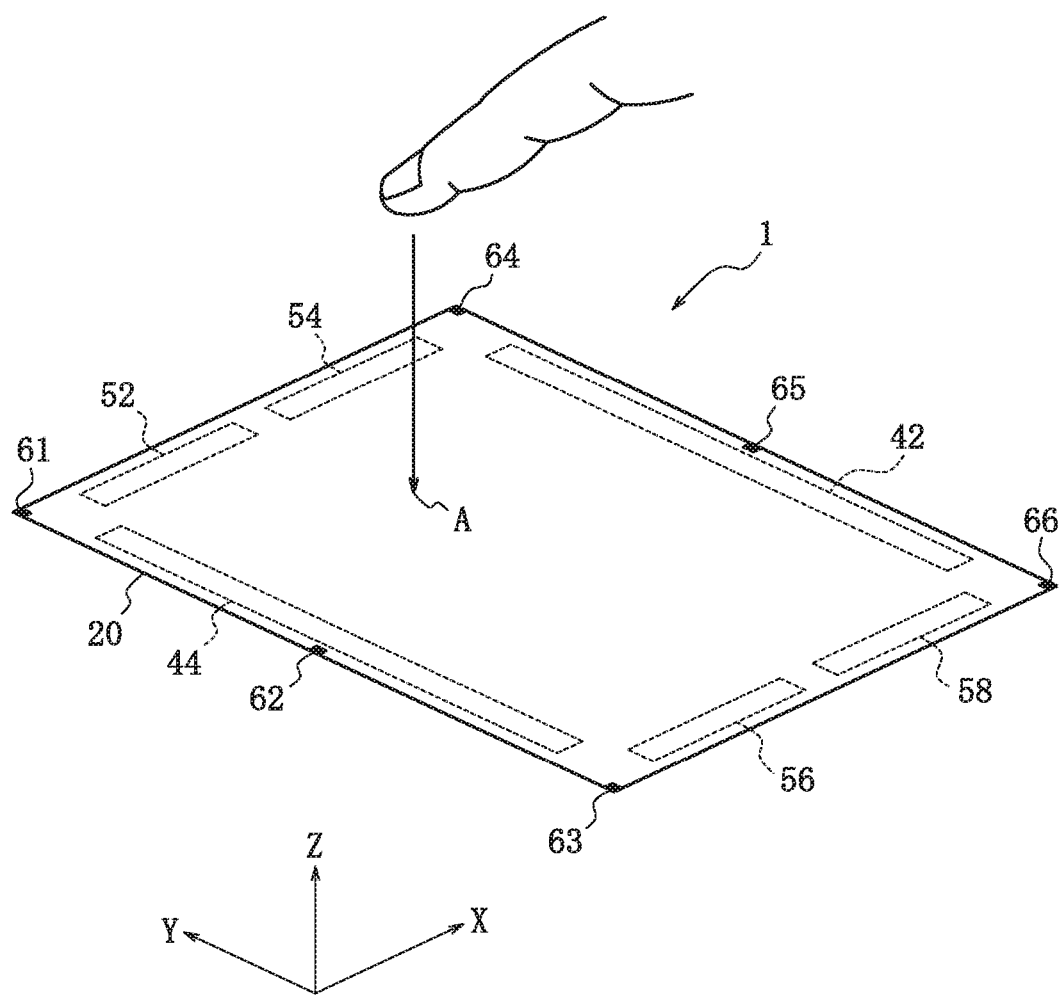
FIG. 2 is a diagram illustrating a configuration around a contact detection unit of the tactile sensation providing apparatus according to the first embodiment.

FIG. 2 is a diagram further illustrating the configuration in the vicinity of the contact detection unit 20 of the tactile sensation providing apparatus 1.

FIG. 2 is a diagram illustrating the arrangement of main function units of the tactile sensation providing apparatus 1 from a viewpoint different from that of FIG. 1. In FIG. 2, the display unit 30 and the controller 10 that are illustrated in FIG. 1 are omitted. FIG. 2 also omits the housing having the contact detection unit 20 attached thereto.

According to the present embodiment, as illustrated in FIG. 2, the contact detection unit 20 is attached to the housing as described above in such a manner as to be supported by six support points 61, 61, 63, 64, 65, and 66. That is, the contact detection unit 20 is fixed to some degrees to the support points 61 to 66. However, when the contact detection unit 20 is excessively firmly fixed to the support points 61 to 66, the vibration of the contact detection unit 20 may be inhibited. Therefore, preferably, the contact detection unit 20 is supported by the support points 61 to 66 in such a manner as to be able to vibrate. For example, the contact detection unit 20 may be attached to the housing via the elastic members at the support points 61 to 66, or portions of the housing at the support points 61 to 66 may be formed with the elastic member. A position of the contact detection unit 20 attached to the housing is not limited to that illustrated in FIG. 2, and the number of the support points is not limited to six. Preferably, depending on the mode of the tactile sensation to be provided by the tactile sensation providing apparatus 1, the positions and the number of the support points may be adjusted.

According to the present embodiment, the controller 10, as illustrated in FIG. 2, for example, determines whether the contact by the contact object such as the operator's finger or the like is detected at a predetermined position (for example, a position A) on the contact detection unit 20. Also, the controller 10, in a state that the contact is detected at the predetermined position on the contact detection unit 20, determines whether the data based on the pressing detected by the pressing detection units 42 and 44 satisfy a predetermined criterion of the pressing to the contact detection unit 20. When the data based on the pressing satisfies the predetermined criterion while the contact at the predetermined position is being detected, the controller 10 drives each of the vibration units 52, 54, 46, and 58.

Thereby, the tactile sensation is provided to the contact object pressing the contact detection unit 20. Note that the pressing detection units 42 and 44 may detect the load based on a mean value of outputs of the pressing detection units 42 and 44. Here, the data satisfying the predetermined criterion is predetermined based on a pressing load of a normal pressing operation of the operator, assuming that data output from the pressing detection units 42 and 44 when the pressing load is, for example, 1N (Newton) satisfy the predetermined criterion. Preferably, such setting may be appropriately changed thereafter based on a user's preference. Also, in order to prevent recognition of an operator's unintentional light contact as an input, and also to provide a realistic tactile sensation of pressing to the operator, the predetermined criterion is set not to be satisfied by an excessively low pressing load.

On the other hand, the data based on the pressing as described above may be set as desired. For example, in an example simplifying the predetermined embodiment, the controller 10, not based on the detection of the pressing by the pressing detection units 42 and 44 but at the time of detection of the contact to the predetermined position by the contact detection unit 20, may vibrate each of the vibration units 52, 54, 56, and 58 and thereby provide the tactile sensation.

According to the present embodiment, also, in a case where the object such as the icon or the button is displayed in the display unit 30 to receive the operator's operation thereto, the tactile sensation is preferably provided only when the position of the contact detected on the contact detection unit 20 corresponds to the object. Thereby, the operator may know through the tactile sensation that the operation to contact or press the object of the icon or the button is appropriately recognized by the tactile sensation providing apparatus 1.

Next, an operation of the tactile sensation providing apparatus 1 of the present embodiment to provide the tactile sensation will be described.

According to the present embodiment, first, an intended tactile sensation provided by vibrating the vibration units 52, 54, 56, and 58 upon the drive signal supplied from the controller 10 will be described. Hereinafter, it is assumed that the controller 10 supplies the drive signals to the vibration units 52 and 54 such that the vibration units 52 and 54 generate the same vibration and supplies the drive signals to the vibration units 56 and 58 such that the vibration units 56 and 58 generate the same vibration.

The tactile sensation providing apparatus 1 of the present embodiment, as desired by a manufacturer thereof, may provide a variety of tactile sensations. The mode of the tactile sensation provided by the tactile sensation providing apparatus 1 is determined based on a variety of factors including the configuration of the tactile sensation providing apparatus 1. Such factors include, for example, a size, a thickness, and a flexural property of the contact detection unit 20 in a panel-like shape, the positions, arrangements, and the number of the vibration units 52, 54, 56, and 58, an attaching state of the contact detection unit 20 to the housing, vibration transmission characteristic of a system including the contact detection unit 20 and the housing.

Also, the mode of the tactile sensation provided by the tactile sensation providing apparatus 1 is highly dependent on the drive signal output from the controller 10. Hence, depending on the drive signal, the tactile sensation provided by the tactile sensation providing apparatus 1 greatly differ.

According to the present embodiment, therefore, the respective drive signals output to the vibration units 52, 54, 56, and 58 by the controller 10 are appropriately controlled such that the intended tactile sensation constituted by predetermined conditions is provided.

According to the present embodiment, the predetermined conditions of the tactile sensation that satisfies an object desired by the manufacturer of the tactile sensation providing apparatus 1 may be, for example, conditions shown below. The tactile sensation caused by the vibration satisfying the conditions shown below is sufficiently strong and clarifies a contrast between a position where the tactile sensation is provided and a position where the tactile sensation is not provided, and thus is considered to be satisfying the object of the manufacturer of the tactile sensation providing apparatus. However, the predetermined conditions of the intended tactile sensation shown below are by way of example, and various other conditions may be employed based on, for example, what is desired by the manufacturer of the tactile sensation providing apparatus 1.
(1) A frequency of the vibration to provide the intended tactile sensation is 100 Hz to 400 Hz;
(2) Amplitude of the vibration to provide the intended tactile sensation is at least 20 μm peak-to-peak; and
(3) A drive signal for generating the vibration to provide the intended tactile sensation is set to one cycle i.e. one wavelength, such that an excellent tactile sensation is provided upon input of the drive signal, avoiding to the utmost to provide the tactile sensation when the drive signal is not input.

However, when the controller 10 merely outputs the same drive signals to the vibration units 52, 54, 56, and 58, it is difficult to provide the intended tactile sensation constituted by the predetermined conditions. The following is a description of this matter.

The following is a description of the tactile sensation provided when the operator presses the position A illustrated in FIG. 2. In FIG. 2, the position A on the contact detection unit 20 pressed by the operator is located in a positive direction of the Y-axis illustrated in FIG. 2. That is, a distance from the vibration units 52 and 54 to the position A is shorter that a distance from the vibration units 56 and 58 to the position A. In this case, driving the vibration units 52 and 54 and the vibration units 56 and 58 by applying the same drive signal thereto will be examined.

FIG. 3 are diagrams illustrating the tactile sensations provided when the vibration units 52, 54, 56, and 58 are driven by applying the same drive signal thereto.

Figure 3A:
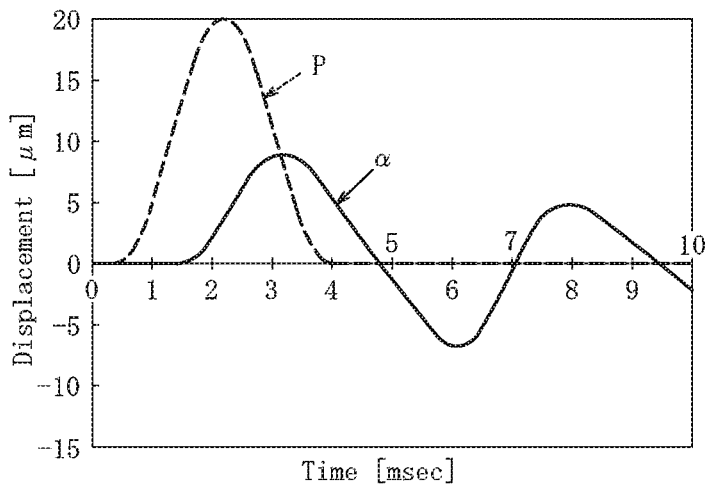
FIGS. 3A to 3C are diagrams illustrating examples of operations of the tactile sensation providing apparatus according to the first embodiment.

FIG. 3A is a diagram illustrating the tactile sensation provided upon driving the vibration units 52 and 54 alone. That is, FIG. 3A illustrates a state in which the vibration units 52 and 54 alone are driven, without driving the vibration units 56 and 58. FIG. 3A illustrates a temporal change in amplitude of a waveform α of the vibration generated at the position A by a pulse of a drive signal P. That is, FIG. 3A illustrates that a vibration with the waveform α is generated at the position A when the waveform α of the drive signal P is input to the vibration units 52 and 54.

Figure 3B:
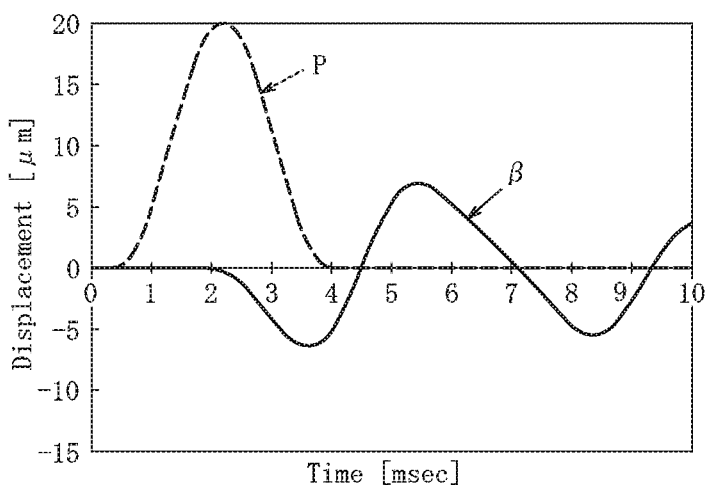

FIG. 3B is a diagram illustrating the tactile sensation provided upon driving the vibration units 56 and 58 alone. That is, FIG. 3B illustrates a state in which the vibration units 56 and 58 alone are driven, without driving the vibration units 52 and 54. FIG. 3B illustrates a temporal change in amplitude of a waveform β of the vibration generated at the position A by the pulse of the drive signal P. That is, FIG. 3B illustrates that a vibration with the waveform β is generated at the position A when the waveform of the drive signal P is input to the vibration units 56 and 58.

As described above, here, the vibration units 52 and 54 and the vibration units 56 and 58 are driven by the same drive signal P. However, since the distance from the position A to the vibration units 52 and 54 and the distance from the position A to the vibration units 56 and 58 are different from each other, the respective tactile sensations provided by the vibration units 52 and 54 and by the vibration units 56 and 58 become different. Therefore, when the vibration units 52 and 54 and the vibration units 56 and 58 are driven by the same drive signal P, a composite wave of the waveform α illustrated in FIG. 3A and the waveform β illustrated in FIG. 3B is generated.

Figure 3C:
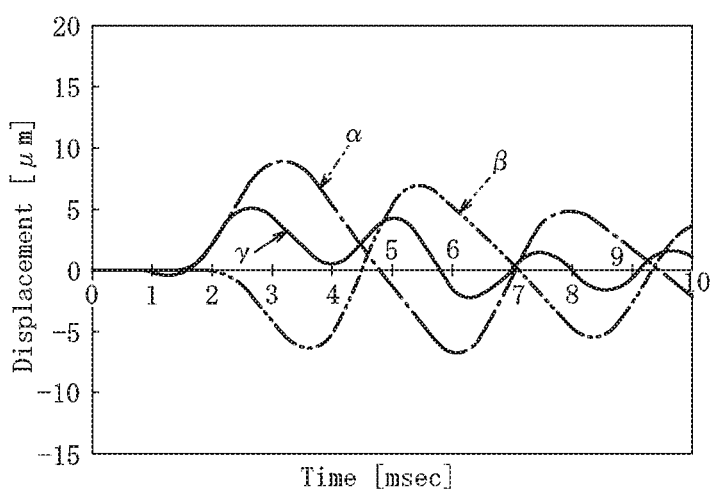

FIG. 3C is a diagram illustrating a composite wave γ of the waveform α illustrated in FIG. 3A and the waveform β illustrated in FIG. 3B. As illustrated in FIG. 3C, the composite wave γ of the waveform α and the waveform β generated by the pulse of the drive signal P is weaker than the original waveforms α and β.

When the waveform of the vibration becomes weak regardless of simultaneous driving of the vibration units 52 and 54 and the vibration units 56 and 58, the intended tactile sensation may not be efficiently provided. According to the present embodiment, therefore, the controller 10 drives the vibration units 52 and 54 and the vibration units 56 and 58 in different modes. In the present embodiment, especially, a temporal adjustment is applied to a vibration wave generated by the vibration units 52 and 54 and a vibration wave generated by the vibration units 56 and 58, thereby the intended tactile sensation is provided. As a concrete example, the controller 10 controls such that timing for the vibration units 52 and 54 to generate the vibration wave and timing for the vibration units 56 and 58 to generate the vibration wave become different from each other.

FIG. 4 are diagrams illustrating the tactile sensations provided when the vibration units 52 and 54 and the vibration units 56 and 58 are driven by using the same drive signals at different timings.

Figure 4A:
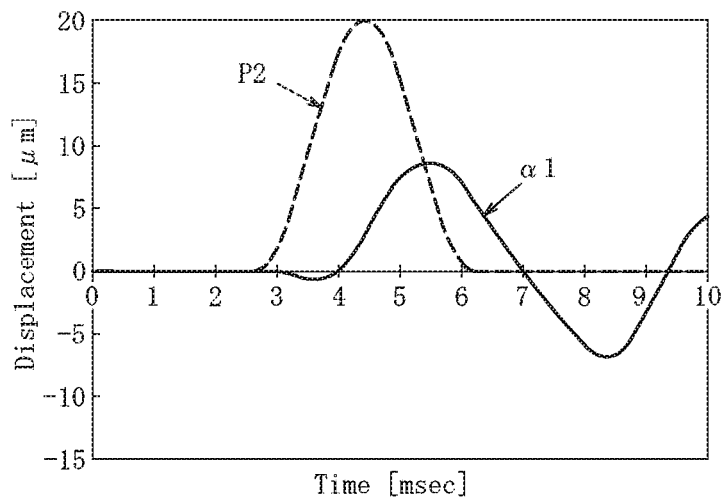
FIGS. 4A to 4C are diagrams illustrating examples of the operations of the tactile sensation providing apparatus according to the first embodiment.

FIG. 4A illustrates a state in which, similarly to FIG. 3A, the vibration units 52 and 54 alone are driven, without driving the vibration units 56 and 58. That is, FIG. 4A illustrates that, when a waveform of a drive signal P2 is input to the vibration units 52 and 54, a vibration with a waveform α1 is generated at the position A.

Figure 4B:
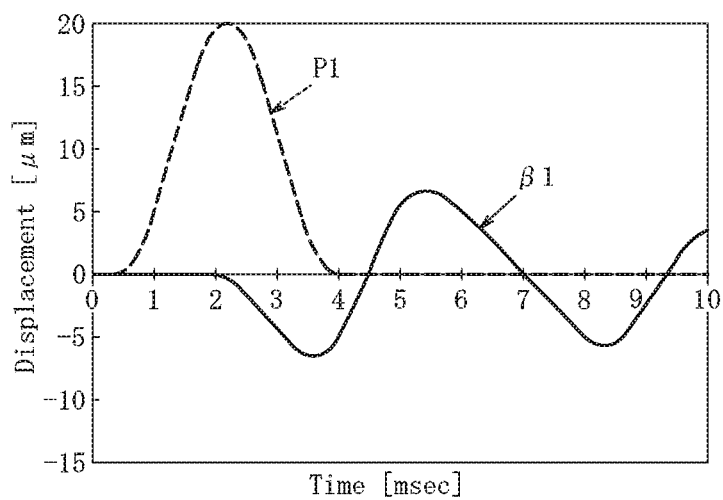

FIG. 4B illustrates a state in which, similarly to FIG. 3B, the vibration units 56 and 58 alone are driven, without driving the vibration units 52 and 54. That is, FIG. 4B illustrates that, when a waveform of a drive signal P1 is input to the vibration units 56 and 58, a vibration with a waveform β1 is generated at the position A.

According to the present embodiment, the vibration units 52 and 54 are driven by the same drive signal, while the vibration units 56 and 58 are driven by the same drive signal. According to the present embodiment, however, timing to drive the vibration units 52 and 54 is delayed from timing to drive the vibration units 56 and 58. In an example illustrated in FIG. 4, a pulse of the drive signal P2 illustrated in FIG. 4A is delayed by approximately 2 msec from a pulse of the drive signal P1 illustrated in FIG. 4B. When the vibration units 52 and 54 and the vibration units 56 and 58 are driven by using the same drive signal at different timings as described above, a composite wave of the waveform α1 illustrated in FIG. 4A and the waveform β1 illustrated in FIG. 4B is generated.

Figure 4C:
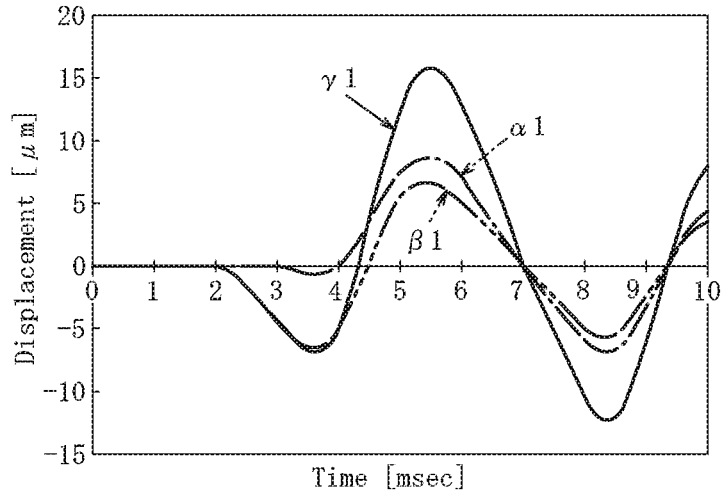

FIG. 4C is a diagram illustrating a composite wave γ1 of the waveform α1 illustrated in FIG. 4A and the waveform β1 illustrated in FIG. 4B. As illustrated in FIG. 4C, the composite wave γ1 of the waveform α1 generated by the pulse of the drive signal P2 and the waveform β1 generated by the pulse of the drive signal P1 is stronger than the original waveforms α1 and β1.

According to the present embodiment, as described above, the controller 10, when the data based on the pressing detected by the pressing detection units 42 and 44 satisfy the predetermined criterion, controls to vibrate each of the vibration units 52, 54, 56, and 58. Also, the controller 10 controls such that the vibration units 52 and 54 and the vibration units 56 and 58 vibrate in the respective modes and the intended tactile sensation is provided to the contact object pressing the contact detection unit 20 where the contact object is in contact with the contact detection unit 20. In the present embodiment, especially, the controller 10, when vibrating each of the vibration units 52, 54, 56, and 58, carries out the temporal adjustment of the respective vibration waves generated by the vibration units 52 and 54 and the vibration units 56 and 58 such that the intended tactile sensation is provided. Here, the temporal adjustment of the vibration waves may be carried out by changing the timing to output the drive signal for generating the vibration. Preferably, the timing to output the drive signal for generating the vibration is changed such that, as illustrated in FIG. 4, a ridge of the waveform α1 of the vibration of the vibration units 52 and 54 and a ridge of the waveform β1 of the vibration of the vibration units 56 and 58 (or valleys thereof) overlap with each other.

As described above, the tactile sensation providing apparatus 1 of the present embodiment adjusts the timings to drive the plurality of vibration units such that peak portions (phases) of the vibration waves generated from the vibration units overlap with each other and the amplitude of the vibration waveform is increased. Accordingly, the tactile sensation providing apparatus 1 of the present embodiment may efficiently provide the intended tactile sensation constituted by the predetermined conditions.

In the above embodiment, which one of a combination of the vibration units 52 and 54 and a combination of the vibration units 56 and 58 is delayed and an amount of the delay may be determined based on various simulations or measurement experiments using actual components in such a manner as to efficiently provide the tactile sensation based on the position of the contact. Generally, the vibration from either one of the vibration units 52 and 54 and the vibration units 56 or 58 located closer to the position where the contact is detected on the contact detection unit 20 is transmitted quicker. Therefore, as the position of the contact detected on the contact detection unit 20 is closer to any one of the vibration units 52, 54, 56, and 58, the drive signal output from the vibration unit of interest is delayed. Preferably, such delay amounts for various occasions (for example, depending on the position of the contact detected on the contact detection unit 20) are preliminarily stored in the controller 10. Alternatively, each time the vibration is generated, the delay amount may be calculated by the controller 10.

Second Embodiment

Next, a second embodiment will be described.

According to the first embodiment as described above, when each of the vibration units 52, 54, 56, and 58 is vibrated, the temporal adjustment is performed to the respective vibration waves generated by the vibration units 52 and 54 and the vibration units 56 and 58 by changing, for example, the timing of the vibration waveform. According to the second embodiment, on the other hand, when each of the vibration units 52, 54, 56, and 58 is vibrated, frequencies of the respective vibration waves generated by the vibration units 52, 54, 56, and 58 are adjusted. Other aspects of the second embodiment may be implemented by the same configuration as the first embodiment described above. That is, the tactile sensation providing apparatus of the present embodiment may be substantialized by the same configuration as the tactile sensation providing apparatus 1 of the first embodiment as described above and different controls by the controller 10. According to the present embodiment, therefore, the same description as the first embodiment will be appropriately simplified or omitted.

Figure 5:
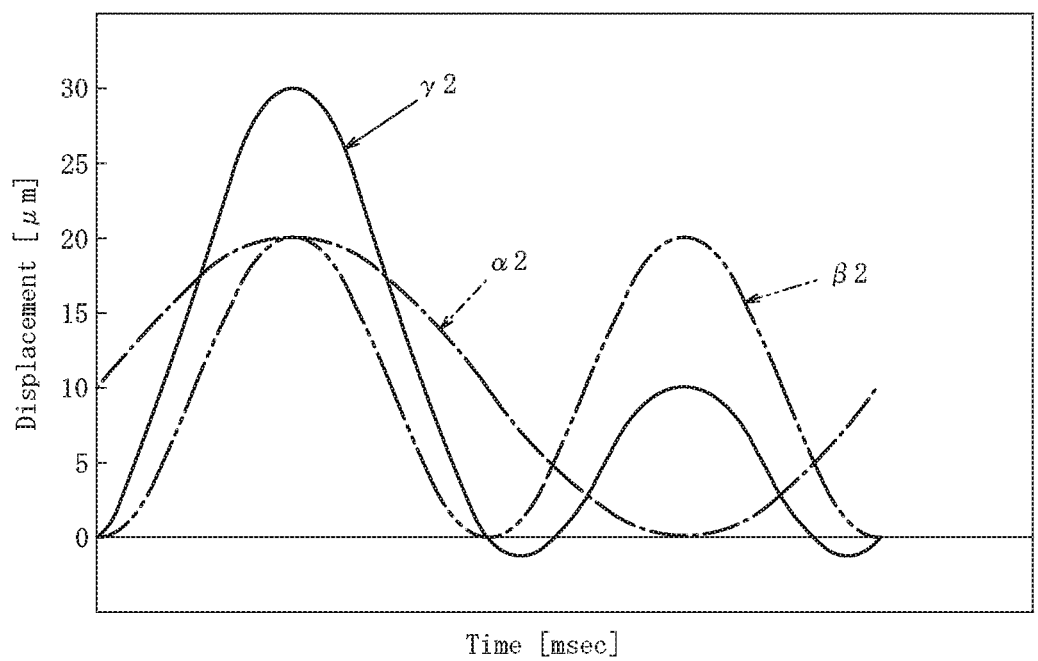
FIG. 5 is a diagram illustrating an example of an operation of a tactile sensation providing apparatus according to a second embodiment.

FIG. 5 is a diagram illustrating the tactile sensation provided when the combination of the vibration units 52 and 54 and the combination of the vibration units 56 and 58 are driven by the drive signals with different frequencies.

In FIG. 5, the vibration generated at the position A when the vibration units 52 and 54 alone are driven, without driving the vibration units 56 and 58, is represented by a waveform α2. According to the present embodiment, when the waveform α2 is prepared as the original vibration waveform, a waveform β2, which is acquired by increasing (or decreasing) the frequency of the waveform α2 based on the distance from the position A where the contact is detected to the respective vibration units, is output as the drive signal. In FIG. 5, the waveform β2 represents the vibration generated at the position A when the vibration units 56 and 58 alone are driven, without driving the vibration units 52 and 54. An example illustrated in FIG. 5, unlike the example illustrated in FIG. 2, illustrates when the distance from the vibration units 56 and 58 to the position A is shorter than the distance from the vibration units 52 and 54 to the position A. As illustrated in FIG. 5, the frequency of the waveform β2 of the vibration generated by the vibration units 56 and 58 that are closer to the position A is higher (approximately 2 times) than the frequency of the waveform α2 of the vibration generated by the vibration units 52 and 54 that are further from the position A. When the combination of the vibration units 56 and 58 and the combination of the vibration units 52 and 54 are driven by the drive signals with different frequencies as described above, a composite wave of the waveform α2 and the waveform β2 is generated.

FIG. 5 illustrates a composite wave γ2 of the waveform α2 and the waveform β2. As illustrated in FIG. 5, the composite wave γ2 of the waveform α2 of a relatively low frequency and the waveform β2 of a relatively high frequency is stronger than the original waveforms α2 and β2.

According to the present embodiment, as described above, the controller 10, when vibrating each of the vibration units 52, 54, 56 and 58, adjusts the frequencies of the respective waveforms generated by the vibration units 52 and 54 and the vibration units 56 and 58, thereby controlling such that the intended tactile sensation is provided. Here, in adjustment of the frequency of the vibration wave, the frequency of the drive signal for generating the vibration is changed before output. In this case, preferably, based on, for example, the position of the contact detected on the contact detection unit 20, the frequency of the drive signal for generating the vibration is changed. Preferably, the frequency of the drive signal for generating the vibration is changed such that, as illustrated in FIG. 5, a ridge of the waveform α2 of the vibration of the vibration units 52 and 54 and a ridge of the waveform β2 of the vibration of the vibration units 56 and 58 (or valleys thereof) overlap with each other.

As described above, the tactile sensation providing apparatus 1 of the present embodiment, by adjusting the frequency of the vibration of the plurality of vibration units, controls the waveform of the composite wave at the position to provide the tactile sensation such that the peak positions (the phases) of the vibration waves generated from the vibration units overlap with each other and the amplitude of the vibration waveform is increased. For example, by changing a parameter of the composite waveform to increase (or reduce) the frequency, the waveform of the vibration may be finely adjusted. Also, since the tactile sensation providing apparatus 1 of the present embodiment adjusts the frequency in such a manner as to overlap peaks of first waves of the respective waveforms generated from the vibration units, peaks of second waves and the subsequent waves may be expected not to overlap with one another but to disperse. Accordingly, the tactile sensation providing apparatus 1 of the present embodiment may provide a strong tactile sensation of the first wave and also reduce an influence by the second and subsequent waves. That is, the tactile sensation providing apparatus 1 of the present embodiment may provide an excellent strong tactile sensation at timing at which the tactile sensation should be provided and, also, suppress an unnecessary tactile sensation from being provided at timing at which the tactile sensation should not be provided. Accordingly, the tactile sensation providing apparatus 1 of the present embodiment may efficiently provide the intended tactile sensation constituted by the predetermined conditions.

In the above embodiment, which one of the frequency of the vibration units 52 and 54 and the frequency of the vibration units 56 and 58 is changed and an amount of the change may be determined in a manner similar to the first embodiment described above. That is, the frequency is set based on various simulations or measurement experiments using actual components in such a manner as to efficiently provide the tactile sensation based on the position of the contact. In the present example, generally, since the pulse of the drive signal for one wavelength alone is output, once the vibration is generated, the entire tactile sensation providing apparatus 1 freely vibrates and the vibration is believed to gradually become closer to a natural vibration. Therefore, as the position of the contact detected on the contact detection unit 20 is closer to any one of the vibration units 52, 54, 56, and 58, the frequency of the drive signal output from the vibration unit of interest should be increased. Preferably, amounts to increase (or decrease) the frequency for various occasions (for example, based on the position of the contact detected on the contact detection unit 20) are preliminarily stored in the controller 10. Alternatively, each time the vibration is generated, the amount to increase (or decrease) may be calculated by the controller 10.

Third Embodiment

Next, a third embodiment will be described.

According to the third embodiment, when vibrating the vibration units 52, 54, 56, and 58 in respective modes in the first or second embodiment described above, a pressure pressing the contact detection unit 20 by the operator is further taken into consideration. Other aspects of the third embodiment may be implemented by the same configuration as the first and second embodiments described above. That is, the tactile sensation providing apparatus of the present embodiment may be substantialized by the same configuration as the tactile sensation providing apparatus 1 of the first or second embodiment as described above and different controls by the controller 10. According to the present embodiment, therefore, the same description as the first or second embodiment will be appropriately simplified or omitted.

According to the first or second embodiment as described above, the tactile sensation is not provided at the timing when the contact of the operation to the contact detection unit 20 by the operator is detected but is provided when the pressure of the operation by the operator increases after the detection of the contact and the data based on the pressing satisfy the predetermined criterion. According to the present embodiment, however, the controller 10 controls such that a first intended tactile sensation is provided when the contact detection unit 20 detects the contact. Then, the controller 10, when the pressure of the operation by the operator increases and the data based on the pressing detected by the pressing detection units 42 and 44 satisfy the predetermined criterion, controls such that a second intended tactile sensation is provided. The first intended tactile sensation and the second intended tactile sensation may be identical but are preferably different for the sake of a distinction.

According to the present embodiment, as described above, when the contact detection unit 20 detects the contact, the controller 10 vibrates each of the vibration units 52, 54, 56, and 58 such that the first intended tactile sensation is provided to the contact object in contact with the contact detection unit 20. Also, when the data based on the pressing detected by the pressing detection units 42 and 44 satisfy the predetermined criterion, the controller 10 vibrates each of the vibration units 52, 54, 56, and 58 such that the second intended tactile sensation is provided to the contact object pressing the contact detection unit 20.

In this way, the tactile sensation providing apparatus 1 of the present embodiment, by providing the first intended tactile sensation, may inform the operator that an object is selected by the contact thereto. Also, the tactile sensation providing apparatus 1 of the present embodiment, by providing the second intended tactile sensation, may inform the operator that the selection of the object is confirmed by the pressing thereto. Thereby, the tactile sensation providing apparatus 1 of the present embodiment may inform the operator in a distinctive manner whether the object is selected or the selection of the object is confirmed by a current operation.

According to the present embodiment, further, in providing the intended tactile sensation at the position where the contact object is in contact with the contact detection unit 20, the vibration units 52, 54, 56, and 58 may be vibrated in the respective modes in consideration of the pressure applied to the contact detection unit 20 by the operator. That is, the tactile sensation providing apparatus 1 of the present embodiment, according to the data based on the pressing detected by the pressing detection units 42 and 44, vibrates the vibration units 52, 54, 56, and 58 in the respective modes.

According to the present embodiment, as described above, when the data based on the pressing detected by the pressing detection units 42 and 44 satisfy the predetermined criterion, the controller 10 vibrates each of the vibration units 52, 54, 56, and 58, in a manner similar to the above first and second embodiments. According to the present embodiment, further, the controller 10 controls such that the intended tactile sensation according to the data based on the pressing is provided to the contact object pressing the contact detection unit 20.

As a concrete example, the tactile sensation providing apparatus 1 of the present embodiment adjusts timings to drive the vibration units 52, 54, 56, and 58 according to the data based on the pressing when the operator touches the contact detection unit 20 and when the operator applies some pressure to the contact detection unit 20. In this case, also, according to the data based on the pressing, the frequency of the drive signal for driving the vibration units 52, 54, 56, and 58 may be adjusted.

Between when the operator is in contact with the contact detection unit 20 and when the operator is pressing the contact detection unit 20, a natural frequency in the entire system of the tactile sensation providing apparatus 1 at the time of transmission of the vibration of the vibration units 52, 54, 56, and 58 is believed to be different. Here, even if the controller 10 outputs the same drive signal when the operator is in contact with the contact detection unit 20, when the operator is lightly pressing the contact detection unit 20, and when the operator is strongly pressing the contact detection unit 20, different tactile sensations are provided. This is believed to be because of a change in the phase and/or the frequency of the waveform due to the change in the waveform of the vibration transmitted.

In such a case, because of the pressing by the operator, a change in the rigidity of a member in its entirety such as the panel constituting the contact detection unit 20 and a change in the natural frequency are expected. Also, because of the pressing by the operator, a position pressing the contact detection unit 20 acts as a pseudo fulcrum and therefore the phase of the waveform may change. Even in such a case, since the tactile sensation providing apparatus 1 of the present embodiment vibrates each of the vibration units 52, 54, 56, and 58 taking the pressure applied by the operator to provide the tactile sensation into consideration, the intended tactile sensation, which may be optimal for each pressing with different pressure, may be provided. Accordingly, the tactile sensation providing apparatus 1 of the present embodiment may efficiently provide the intended tactile sensation constituted by the predetermined conditions.

In the above embodiment, based on how much pressure, which one of the timing of the waveform of the vibration units 52 and 54 and the timing of the waveform of the vibration units 56 and 58 is changed, and an amount to change the frequency may be determined in a manner similar to the first and second embodiments described above. That is, based on various simulations or measurement experiments using actual components, the setting may be performed in such a manner as to efficiently provide the tactile sensation based on the position of the contact. Generally, it is believed that, as the pressure applied by the operator is stronger, the system of the tactile sensation providing apparatus 1 for transmitting the vibration becomes harder, and it is also believed that, based on the position where the operator is pressing the contact detection unit 20, the entire vibration mode changes with the pressing position acting as a fulcrum. Therefore, preferably, the amount to increase (or decrease) the frequency to be adjusted and/or the delay amount of the timing to output the drive signal based on various pressure at various pressing positions on the contact detection unit 20 are preliminarily stored in the controller 10. Alternatively, each time the vibration is generated, the amount to increase (or decrease) the frequency and/or the delay amount may be calculated by the controller 10.

Although the disclosure has been described based on the figures and the embodiments, it is to be understood that various changes and modifications may be implemented based on the present disclosure by those who are ordinarily skilled in the art. Accordingly, such changes and modifications are included in the scope of the disclosure herein. For example, functions and the like included in each unit, each means, each step and the like may be rearranged without logical inconsistency, so as to combine a plurality of units or steps together or to divide them. Also, the above embodiments are not intended to be carried out strictly as described above but may be carried out by combining features thereof.

In the above embodiments, also, the pressing detection unit may be configured according to a contact detection method of the contact detection unit. For example, when the contact detection unit is of the resistive film type, the pressing detection unit capable of detecting the load from a change in the output signal based on a resistive change according to the contact area may be constituted without using a strain gauge sensor. Or, when the contact detection unit is of the capacitive type, the pressing detection unit capable of detecting the load from a change in the output signal based on a change in the capacitance may be constituted without using the strain gauge sensor.

In the above embodiments, the contact detection unit is disposed on top (on a front surface) of the display unit in an overlapping manner. However, the tactile sensation providing apparatus of the disclosure herein does not need to have such a structure but may have a structure in which the contact detection unit and the display unit are spaced apart from each other. Nevertheless, when the contact detection unit is disposed on top of the display unit in the overlapping manner, it is easier for the operator to recognize a correspondence between a displayed image and the tactile sensation being provided.

In the above embodiments, also, when the data based on the pressing detected based on the output of the piezoelectric element constituting the pressing detection unit satisfy the predetermined criterion, the piezoelectric elements constituting the vibration units are vibrated. Here, when the data based on the pressing detected based on the output of the piezoelectric element may be: when the data based on the detected pressing reach the predetermined criterion; when the data based on the detected pressing exceed the predetermined criterion; or when the predetermined criterion is detected from the data based on the pressing output from the pressing detection unit.

Also, the display unit 30 and the contact detection unit 20 in the above embodiments may be constituted by using an integrated apparatus such as a common substrate and the like having both the function of the display unit and the function of the contact detection unit. An example of such an apparatus having a combination of both functions of the display unit and the contact detection unit may be a liquid crystal panel having a matrix array of a pixel electrode group regularly mixed with a plurality of photoelectric conversion elements such as photodiodes. This apparatus allows the liquid crystal display to display an image and, also, may detect the contact position when a tip of a pen for inputting by contacting a desired position on a surface of the display reflects backlight of the liquid crystal display and the reflected light is received by a nearby photoelectric conversion element.

Note that the vibration units 52, 54, 56, and 58 may be configured to indirectly vibrate the contact detection unit 20 by vibrating the tactile sensation providing apparatus 1 by using a vibration motor (an eccentric motor) or the like. Or, the piezoelectric elements serving as the vibration units 52, 54, 56, and 58 may be provided to the contact detection unit 20 such that the contact detection unit 20 is directly vibrated.

Or, for example, when the pressing detection units 42 and 44 and the vibration units 52, 54, 56, and 58 are constituted by using the piezoelectric elements, a unit serving as both the pressing detection unit and the vibration unit may be configured by using the piezoelectric element in a sharing manner. This is because the piezoelectric element generates power upon application of a pressure thereto and deforms upon application of power thereto.

Note that, in order for the contact detection unit 20 to detect the contact, the contact object does not necessarily have to physically touch the contact detection unit 20. For example, the contact detection unit 20 of the optical type detects a position where the infrared rays on the contact detection unit 20 is blocked by the finger, the stylus pen, or the like. Therefore, the contact object does not need to touch the contact detection unit 20.

According to the disclosure herein, also, when the pressing load detected by the pressing detection units 42 and 44 satisfies the predetermined criterion set for a load to be recognized as an input, the vibration units 52, 54, 56, and 58 are driven. Here, when the pressing load detected by the pressing detection units 42 and 44 satisfies the predetermined criterion set for a load to be recognized as an input may be: when the pressing load detected by the pressing detection units 42 and 44 reaches a predetermined value to be recognized as an input; when the pressing load detected by the pressing detection units 42 and 44 exceeds the predetermined value to be recognized as an input; or when the predetermined value to be recognized as an input is detected by the pressing detection units 42 and 44.

Many aspects of the disclosure herein may be represented by a series of operations executed by a computer system or other hardware those are capable of executing a program instruction. The computer system or the other hardware include, for example, a general-purpose computer, a PC (personal computer), a special purpose computer, a workstation, PCS (Personal Communications System; a personal mobile communication system), a mobile (cellular) phone, a mobile phone having a data processing function, an RFID receiver, a game machine, an electronic notepad, a laptop computer, a GPS (Global Positioning System) receiver, and other programmable data processing apparatuses. Note that in the embodiments the various operations are executed by a dedicated circuit implemented with a program instruction (software) (e.g., discrete logic gates interconnected to perform a function), or a logical block, a program module and the like executed by at least one processor. The at least one processor for executing the logical block, the program module and the like includes, for example, at least one microprocessor, CPU (Central Processing Unit), ASIC (Application Specific Integrated Circuit), DSP (Digital Signal Processor), PLD (Programmable Logic Device), FPGA (Field Programmable Gate Array), a processor, a controller, a microcontroller, a microprocessor, an electronic apparatus, and other apparatuses designed to be capable of executing the functions described herein, and/or a combination thereof. The embodiment presented herein is implemented by, for example, hardware, software, firmware, middleware, a microcode, or any combination thereof. The instruction may be a program code or a code segment for executing a necessary task. The instruction may be stored in a machine-readable non-transitory storage medium or in another medium. The code segment may represent any combination of a procedure, a function, a subprogram, a program, a routine, a subroutine, a module, a software package, a class or an instruction, and a date structure or a program statement. The code segment, with another code segment or a hardware circuit, transmits/receives information, a data argument, a variable, and memory contents. Thereby, the code segment is connected to the another code segment or the hardware circuit.

Also, the machine-readable non-transitory storage medium may be constituted by using a solid state memory or a tangible carrier (medium) readable by the computer such as a magnetic disk and an optical disk, and stores an appropriate set of computer instructions such as program modules and a data structure those for making the processor to execute the technique disclosed herein. The computer-readable medium includes an electric connection with at least one wiring, a magnetic disk storage media, a magnetic cassette, a magnetic tape, other magnetic and optical storage devices (e.g., a CD (Compact Disk), a laser disk, a DVD (Digital Versatile Disc), a floppy disk, and a Blu-ray disc), a portable computer disk, RAM (Random Access Memory), ROM (Read-Only Memory), a ROM such as an EPROM, an EEPROM, or a flash memory that is rewritable and programmable, other tangible storage media capable of storing information, or any combination thereof. The memory may be provided inside and/or outside the processor/processing unit. Here, the term "memory" means all types of a long-term memory, a short-term memory, a volatile memory, a non-volatile memory, and other memories. A type of the memory, the number of memories, and a type of the medium to store the information are not limited.

Note that the system disclosed herein includes various modules and/or units for executing specific functions, and the modules and/or the units are schematically illustrated for the purpose of brief description of functionality thereof and do not necessarily represent specific hardware and/or software. In that sense, these modules, units, and other components may be any hardware and/or software implemented to substantially execute the specific functions described herein. Various functions of different components may be substantialized by combining or separating the hardware and/or the software in any manner, and may be used separately or in any combination. Further, an input/output or I/O device and a user interface may be a keyboard, a display, a touch screen, a pointing device, and the like but not limited thereto, and may be connected to the system directly, or via an I/O controller that intervenes. As described above, various aspects of the disclosure herein may be implemented in various embodiments, and all the various embodiments are included in the scope of the disclosure herein.

REFERENCE SIGNS LIST

1 tactile sensation providing apparatus
10 controller
20 contact detection unit
30 display unit
42, 44 pressing detection unit
52, 54, 56, 58 vibration unit
61-66 support point

The invention claimed is:

1. A tactile sensation providing apparatus comprising:
a contact detection unit configured to detect a contact;
a pressing detection unit configured to detect pressing to the contact detection unit;
a plurality of vibration units configured to vibrate the contact detection unit; and
a controller configured to:
vibrate the plurality of vibration units according to a respective plurality of vibration waves when data based on the pressing detected by the pressing detection unit satisfies a predetermined criterion; and
adjust the plurality of vibration waves such that the plurality of vibration waves are in phase at a position where a contact object is in contact with the contact detection unit and an intended tactile sensation is provided to the contact object pressing the contact detection unit,
wherein the plurality of vibration units includes a first subset of vibration units and a second subset of vibration units,
the vibration units included in the first subset are located closer to the position than the vibration units included in the second subset,
the first subset of vibration units located closer to the position than the second subset is driven by a first drive signal of higher frequency than a second drive signal for the second subset, and
when the intended tactile sensation is provided, the controller is configured to adjust frequencies of the first and second drive signals based on how much pressure the pressing has, thereby preventing the plurality of vibration units from providing tactile sensations which are different from the intended tactile sensation.

2. The tactile sensation providing apparatus according to claim 1, wherein
the controller, in vibrating each of the plurality of vibration units, adjusts a timing of the plurality of vibration waves generated by the plurality of vibration units such that the plurality of vibration waves are in phase at the position and the intended tactile sensation is provided.

3. The tactile sensation providing apparatus according to claim 1, wherein
the controller, in vibrating each of the plurality of vibration units, adjusts frequencies of the plurality of vibration waves generated by the plurality of vibration units such that the plurality of vibration waves are in phase at the position and the intended tactile sensation is provided.

4. The tactile sensation providing apparatus according to claim 1, wherein
the controller controls such that
when the contact detection unit detects the contact, and the data based on the pressing detected by the pressing detection unit does not satisfy the predetermined criterion, each of the plurality of vibration units are vibrated and a first intended tactile sensation is provided to the contact object in contact with the contact detection unit, and
when the data based on the pressing detected by the pressing detection unit satisfies the predetermined criterion, each of the plurality of vibration units are vibrated and a second intended tactile sensation is provided to the contact object pressing the contact detection unit at the position where the contact object is in contact with the contact detection unit.

5. The tactile sensation providing apparatus according to claim 1, wherein
the controller controls such that, when the data based on the pressing detected by the pressing detection unit satisfies the predetermined criterion, each of the plurality of vibration units are vibrated and an intended tactile sensation corresponding to the data based on the pressing is provided to the contact object pressing the contact detection unit at the position where the contact object is in contact with the contact detection unit.

6. The tactile sensation providing apparatus according to claim 1, wherein
the plurality of vibration units includes a first subset of vibration units and a second subset of vibration units,
the vibration units included in the first subset are different from the vibration units included in the second subset, and
the controller, in vibrating each of the plurality of vibration units, controls such that the first subset of vibration units generates a first vibration wave at a first timing, and the second subset of vibration units generates a second vibration wave at a second timing different from the first timing.

7. The tactile sensation providing apparatus according to claim 1, wherein
the plurality of vibration units includes a first subset of vibration units and a second subset of vibration units,
the vibration units included in the first subset are different from the vibration units included in the second subset, and
the controller, in vibrating each of the plurality of vibration units such that the intended tactile sensation is provided, outputs a first drive signal at a first timing to drive the first subset of vibration units to generate a first vibration wave, and outputs a second drive signal at a second timing, different from the first timing, to drive the second subset of vibration units to generate a second vibration wave.

8. The tactile sensation providing apparatus according to claim 1, wherein
the plurality of vibration units includes a first subset of vibration units and a second subset of vibration units,
the vibration units included in the first subset are different from the vibration units included in the second subset, and
the controller, in vibrating each of the plurality of vibration units such that the intended tactile sensation is provided, outputs a first drive signal of a first frequency to drive the first subset of vibration units to generate a first vibration wave, and outputs a second drive signal of a second frequency, different from the first frequency, to drive the second subset of vibration units to generate a second vibration wave.

* * * * *